(12) United States Patent
Chen

(10) Patent No.: US 8,660,788 B2
(45) Date of Patent: Feb. 25, 2014

(54) NAVIGATION SYSTEM WITH AUDIO AND METHOD OF OPERATION THEREOF

(75) Inventor: Qian Chen, Fremont, CA (US)

(73) Assignee: Telenav, Inc., Sunnyvale, CA (US)

( * ) Notice: Subject to any disclaimer, the term of this patent is extended or adjusted under 35 U.S.C. 154(b) by 400 days.

(21) Appl. No.: 12/634,621

(22) Filed: Dec. 9, 2009

(65) Prior Publication Data

US 2011/0137556 A1 Jun. 9, 2011

(51) Int. Cl.
*G01C 21/26* (2006.01)

(52) U.S. Cl.
USPC .......................................... 701/408; 701/532

(58) Field of Classification Search
USPC .................. 701/400, 408–410, 412, 418, 419, 701/424–426, 438, 440, 468; 455/456.3
See application file for complete search history.

(56) References Cited

U.S. PATENT DOCUMENTS

| | | | |
|---|---|---|---|
| 6,266,614 B1 | 7/2001 | Alumbaugh | |
| 6,427,118 B1 | 7/2002 | Suzuki | |
| 6,922,633 B2 | 7/2005 | Takenaka | |
| 2004/0093155 A1 | 5/2004 | Simonds et al. | |
| 2004/0260465 A1* | 12/2004 | Tu | 701/209 |
| 2005/0091184 A1* | 4/2005 | Seshadri et al. | 707/1 |
| 2006/0095201 A1 | 5/2006 | Chao | |
| 2007/0073934 A1* | 3/2007 | Rogers | 710/59 |
| 2008/0007399 A1 | 1/2008 | Hart | |
| 2008/0027632 A1 | 1/2008 | Mauderer | |
| 2009/0018766 A1 | 1/2009 | Chen et al. | |
| 2009/0043500 A1 | 2/2009 | Satoh | |
| 2009/0088964 A1* | 4/2009 | Schaaf et al. | 701/200 |
| 2010/0088018 A1* | 4/2010 | Tsurutome et al. | 701/201 |
| 2010/0222078 A1* | 9/2010 | Tysowski | 455/456.3 |

OTHER PUBLICATIONS

International Search Report for Application No. PCT/US2010/059742 dated Feb. 8, 2011.

* cited by examiner

*Primary Examiner* — Marthe Marc-Coleman
(74) *Attorney, Agent, or Firm* — IP Investment Law Group

(57) ABSTRACT

A method of operation of a navigation system includes: configuring a preference; selecting an introduction point based on the preference; composing an introduction message about the introduction point; and displaying a non-intrusive notification for the introduction message on a device.

20 Claims, 6 Drawing Sheets

NAVIGATION SYSTEM WITH AUDIO AND METHOD OF OPERATION THEREOF

TECHNICAL FIELD

The present invention relates generally to a navigation system, and more particularly to a system for a navigation system with audio.

BACKGROUND ART

Vehicle navigation systems have been developed and are increasingly becoming available for use in assisting drivers to navigate a vehicle. For example, onboard navigation systems are currently provided in automotive vehicles to assist the driver of the vehicle in navigating along a route or roadway system to reach a desired destination.

The vehicle navigation systems generally provide a recommended route from a starting point to a desired destination. Typically, one or both of the starting point and the desired destination are selected from a large database of roads that are stored in a mass media storage. When the user desires directions to a particular location, the user conducts a search for the desired destination from the database and then selects the destination from a hit list to generate the map thereto.

In addition to displaying the vehicle position along a route, a navigation system can typically also display the vehicle location even when no route is programmed. In this case, the navigation system does not have a route that provides a context for the display. Some navigation systems that incorporate relatively large color display screens can display the vehicle location in a map when no route is programmed.

Other navigation systems, however, incorporate smaller display screens. Rendering the vehicle location is difficult because the display screen is too small to display a map that is both sufficiently detailed and sufficiently free of clutter to be useful. For example, the map may be rendered at a sufficient level of detail, but contain so much clutter as to be unreadable from the position of the driver.

Even with a relatively large display screen, some users may find the map too cluttered to be useful. On the other hand, the map may be sufficiently free of clutter to allow the driver to locate the visual representation of the car, but lack detailed information as to surrounding streets. In either case, the driver does not significantly benefit from the map.

Thus, a need still remains for a navigation system with a notification mechanism for providing a user-friendly experience and safety. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: configuring a preference; selecting an introduction point based on the preference; composing an introduction message about the introduction point; and displaying a non-intrusive notification for the introduction message on a device.

The present invention provides a navigation system, including: a storage unit for configuring a preference stored and accessed in the storage unit; a location unit, coupled to the storage unit, for selecting an introduction point based on the preference; a control unit, coupled to the location unit, for composing an introduction message about the introduction point; and a user interface, coupled to the control unit, for displaying a non-intrusive notification for the introduction message on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
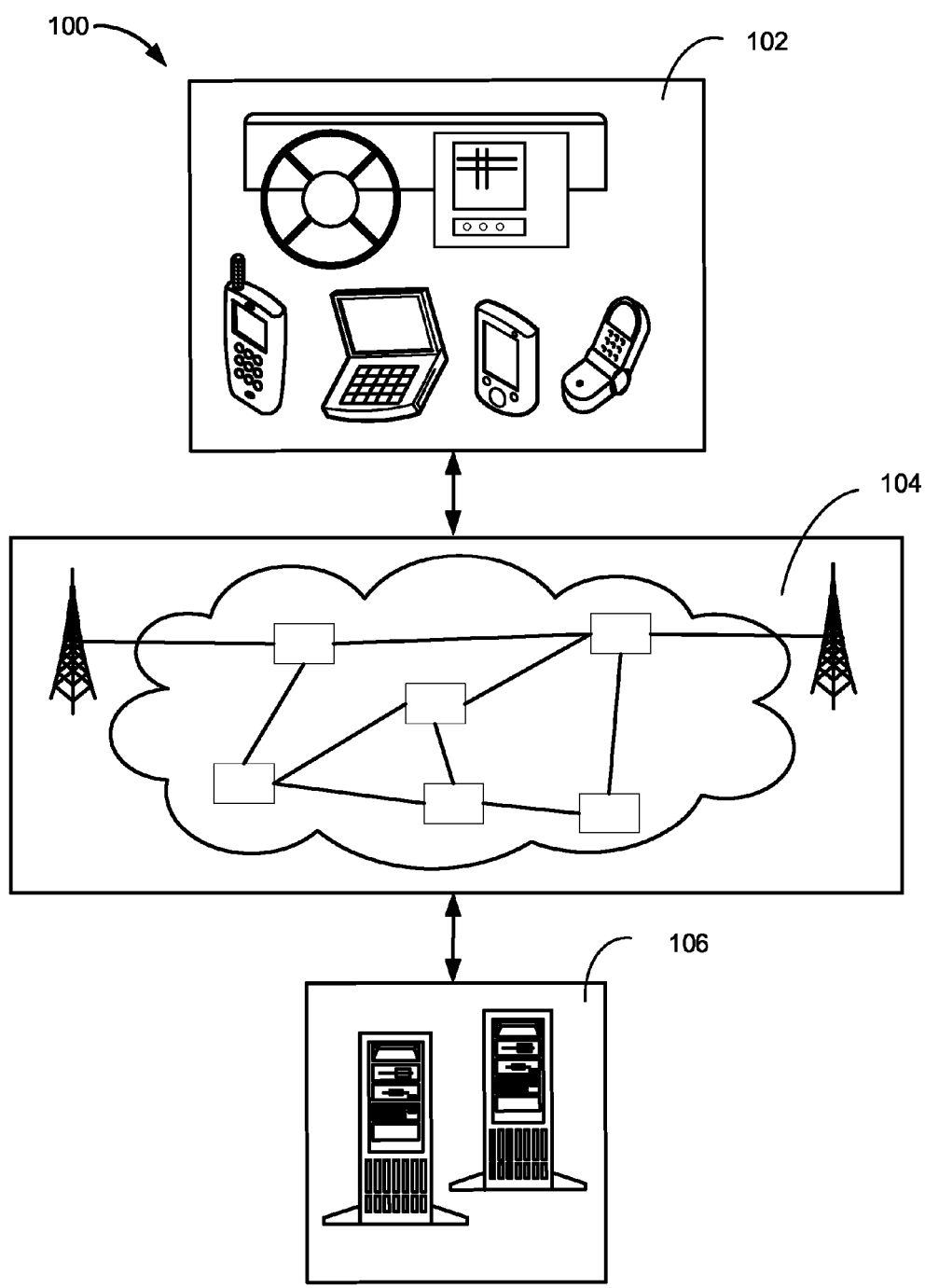
FIG. 1 is a navigation system with audio processing mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with audio processing mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
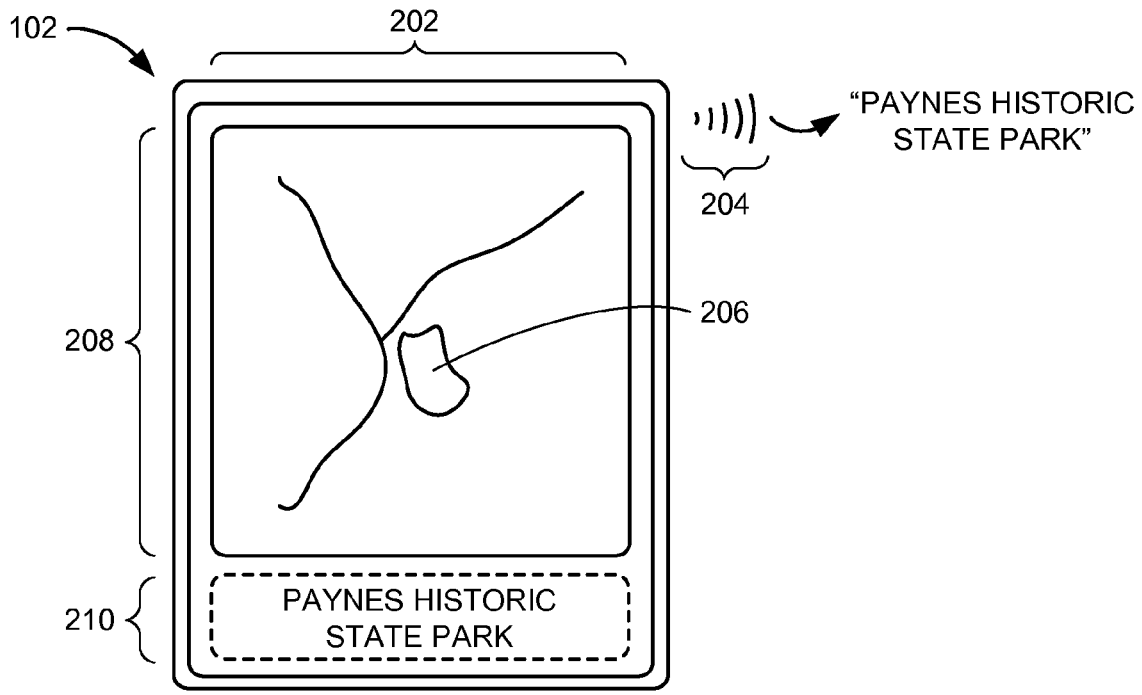
FIG. 2 is an example of a display interface of the first device.

Referring now to FIG. 2, therein is shown an example of a display interface 202 of the first device 102. The display interface 202 is shown having an example of simulated navigational information displayed and a text representation of simulated audio output. The display interface 202 can include a display, a projector, a video screen, a speaker, or any combination thereof.

The display interface 202 can include an audible introduction message 204. The audible introduction message 204 can include audible information about an introduction point 206 along a route. The introduction point 206 can include a specific point location that can be useful or interesting. For example, the introduction point 206 can include "Paynes Historic State Park" as a portion of the audible information about a park of interest.

The display interface 202 can include a navigation map 208, which can include a visual presentation of an area. The navigation map 208 can also include the introduction point 206. The display interface 202 can include a textual introduction message 210. The textual introduction message 210 can include visual information about the introduction point 206 along the route.

Figure 3:
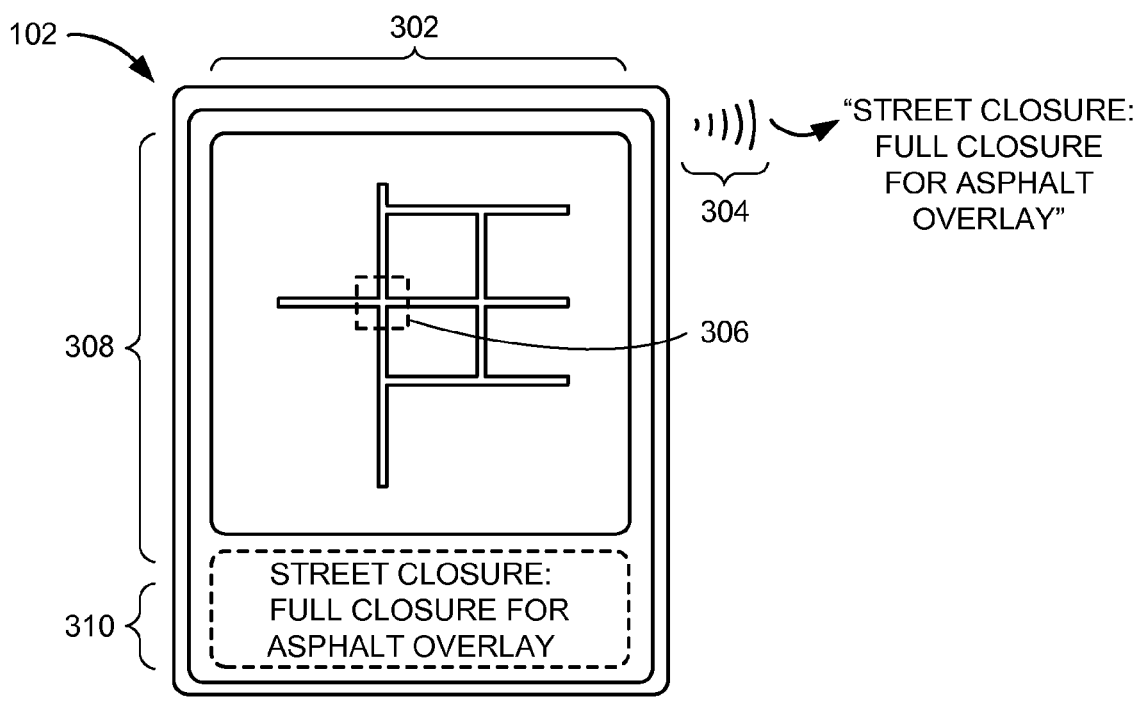
FIG. 3 is another example of a display interface of the first device.

Referring now to FIG. 3, therein is shown another example of a display interface 302 of the first device 102. The display interface 302 is shown having an example of simulated navigational information displayed and a text representation of simulated audio output. The display interface 302 can include a display, a projector, a video screen, a speaker, or any combination thereof.

The display interface 302 can include an audible introduction message 304. The audible introduction message 304 can include audible information about an introduction point 306 along a route. The introduction point 306 can include a specific point location that can be useful or interesting.

The introduction point 306 can include information about an emergency or an obstacle that can affect or impede traffic. For example, the introduction point 306 can include "Street Closure: Full Closure for Asphalt Overlay" as a portion of the audible information about a road closure due to a road construction.

The display interface 302 can include a navigation map 308, which can include a visual presentation of an area. The navigation map 308 can also include the introduction point 306. The display interface 302 can include a textual introduction message 310. The textual introduction message 310 can include visual information about the introduction point 306 along the route.

Figure 4:
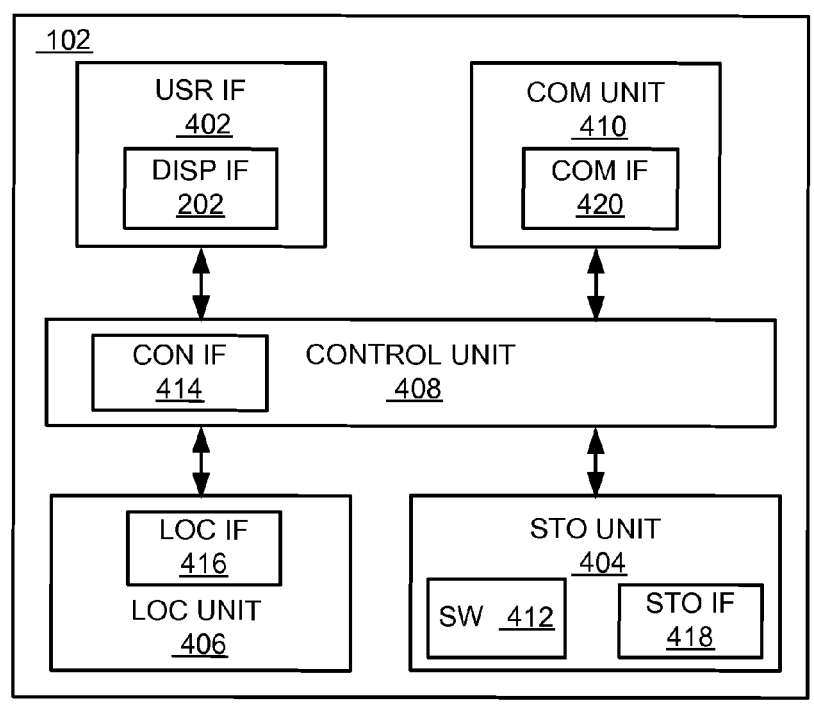
FIG. 4 is an exemplary block diagram of the first device.

Referring now to FIG. 4, therein is shown an exemplary block diagram of the first device 102. The first device 102 can include a user interface 402, a storage unit 404, a location unit 406, a control unit 408, and a communication unit 410.

The user interface 402 allows a user (not shown) to interface and interact with the first device 102. The user interface 402 can include an input device and an output device. Examples of the input device of the user interface 402 can include a keypad, a touchpad, soft-keys, a keyboard, a microphone, or any combination thereof to provide data and communication inputs. Examples of the output device of the user interface 402 can include the display interface 202. The display interface 202 can include a display, a projector, a video screen, a speaker, or any combination thereof.

The control unit 408 can execute a software 412 to provide the intelligence of the navigation system 100. The control unit 408 can operate the user interface 402 to display information generated by the navigation system 100. The control unit 408 can also execute the software 412 for the other functions of the navigation system 100, including receiving location information from the location unit 406. The control unit 408 can further execute the software 412 for interaction with the communication path 104 of FIG. 1 via the communication unit 410.

The control unit 408 can be implemented in a number of different manners. For example, the control unit 408 can be a processor, an embedded processor, a microprocessor, a hardware control logic, a hardware finite state machine (FSM), a digital signal processor (DSP), or a combination thereof.

The control unit 408 can include a controller interface 414. The controller interface 414 can be used for communication between the control unit 408 and other functional units in the first device 102. The controller interface 414 can also be used for communication that is external to the first device 102.

The controller interface 414 can receive information from the other functional units or from external sources, or can transmit information to the other functional units or to external destinations. The external sources and the external destinations refer to sources and destinations external to the first device 102.

The controller interface 414 can be implemented in different ways and can include different implementations depending on which functional units or external units are being interfaced with the controller interface 414. For example, the controller interface 414 can be implemented with a pressure sensor, an inertial sensor, a microelectromechanical system (MEMS), optical circuitry, waveguides, wireless circuitry, wireline circuitry, or a combination thereof.

The location unit 406 can generate location information, current heading, and current speed of the first device 102, as examples. The location unit 406 can be implemented in many ways. For example, the location unit 406 can function as at least a part of a global positioning system (GPS), an inertial navigation system, a cellular-tower location system, a pressure location system, or any combination thereof.

The location unit 406 can include a location interface 416. The location interface 416 can be used for communication between the location unit 406 and other functional units in the first device 102. The location interface 416 can also be used for communication that is external to the first device 102.

The location interface 416 can receive information from the other functional units or from external sources, or can transmit information to the other functional units or to external destinations. The external sources and the external destinations refer to sources and destinations external to the first device 102.

The location interface 416 can include different implementations depending on which functional units or external units are being interfaced with the location unit 406. The location interface 416 can be implemented with technologies and techniques similar to the implementation of the controller interface 414.

The storage unit 404 can store the software 412. The storage unit 404 can also store the relevant information, such as advertisements, points of interest (POI), navigation routing entries, or any combination thereof.

The storage unit 404 can be a volatile memory, a nonvolatile memory, an internal memory, an external memory, or a combination thereof. For example, the storage unit 404 can be a nonvolatile storage such as non-volatile random access memory (NVRAM), Flash memory, disk storage, or a volatile storage such as static random access memory (SRAM).

The storage unit 404 can include a storage interface 418. The storage interface 418 can be used for communication between the location unit 406 and other functional units in the first device 102. The storage interface 418 can also be used for communication that is external to the first device 102.

The storage interface 418 can receive information from the other functional units or from external sources, or can transmit information to the other functional units or to external destinations. The external sources and the external destinations refer to sources and destinations external to the first device 102.

The storage interface 418 can include different implementations depending on which functional units or external units are being interfaced with the storage unit 404. The storage interface 418 can be implemented with technologies and techniques similar to the implementation of the controller interface 414.

The communication unit 410 can enable external communication to and from the first device 102. For example, the communication unit 410 can permit the first device 102 to communicate with the second device 106 of FIG. 1, an attachment, such as a peripheral device or a computer desktop, and the communication path 104.

The communication unit 410 can also function as a communication hub allowing the first device 102 to function as part of the communication path 104 and not limited to be an end point or terminal unit to the communication path 104. The communication unit 410 can include active and passive components, such as microelectronics or an antenna, for interaction with the communication path 104.

The communication unit 410 can include a communication interface 420. The communication interface 420 can be used for communication between the communication unit 410 and other functional units in the first device 102. The communication interface 420 can receive information from the other functional units or can transmit information to the other functional units.

The communication interface 420 can include different implementations depending on which functional units are being interfaced with the communication unit 410. The communication interface 420 can be implemented with technologies and techniques similar to the implementation of the controller interface 414.

For illustrative purposes, the navigation system 100 is shown with the partition having the user interface 402, the storage unit 404, the location unit 406, the control unit 408, and the communication unit 410 although it is understood that the navigation system 100 can have a different partition. For example, the software 412 can be partitioned differently such that some or all of its function can be in the control unit 408, the location unit 406, and the communication unit 410. Also, the first device 102 can include other functional units not shown in FIG. 4 for clarity.

The functional units in the first device 102 can work individually and independently of the other functional units. The first device 102 can work individually and independently from the second device 106 and the communication path 104.

Figure 5:
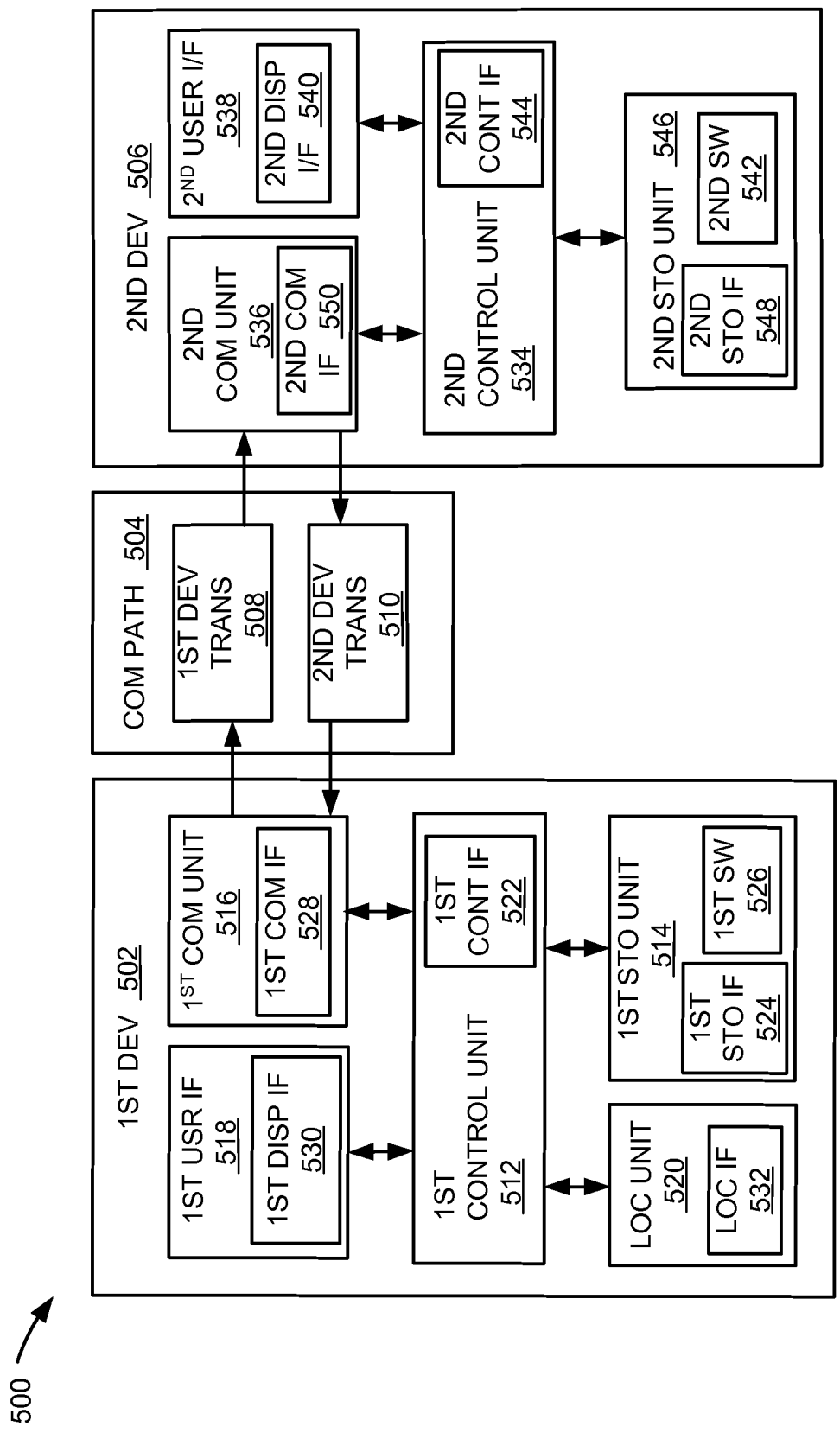
FIG. 5 is an exemplary block diagram of a navigation system with audio processing mechanism in a second embodiment of the present invention.

Referring now to FIG. 5, therein is shown an exemplary block diagram of a navigation system 500 with audio processing mechanism in a second embodiment of the present invention. The navigation system 500 can include a first device 502, a communication path 504, and a second device 506.

The first device 502 can communicate with the second device 506 over the communication path 504. For example, the first device 502, the communication path 504, and the second device 506 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 500.

The first device 502 can send information in a first device transmission 508 over the communication path 504 to the second device 506. The second device 506 can send information in a second device transmission 510 over the communication path 504 to the first device 502.

For illustrative purposes, the navigation system 500 is shown with the first device 502 as a client device, although it is understood that the navigation system 500 can have the first device 502 as a different type of device. For example, the first device 502 can be a server.

Also for illustrative purposes, the navigation system 500 is shown with the second device 506 as a server, although it is understood that the navigation system 500 can have the second device 506 as a different type of device. For example, the second device 506 can be a client device.

For brevity of description in this embodiment of the present invention, the first device 502 will be described as a client device and the second device 506 will be described as a server device. The present invention is not limited to this selection for the type of devices. The selection is an example of the present invention.

The first device 502 can include a first control unit 512, a first storage unit 514, a first communication unit 516, a first user interface 518, and a location unit 520. The first device 502 can be similarly described by the first device 102.

The first control unit 512 can include a first controller interface 522. The first control unit 512 and the first controller interface 522 can be similarly described as the control unit 408 of FIG. 4 and the controller interface 414 of FIG. 4, respectively.

The first storage unit 514 can include a first storage interface 524. The first storage unit 514 and the first storage interface 524 can be similarly described as the storage unit 404 of FIG. 4 and the storage interface 418 of FIG. 4, respectively. A first software 526 can be stored in the first storage unit 514.

The first communication unit 516 can include a first communication interface 528. The first communication unit 516 and the first communication interface 528 can be similarly described as the communication unit 410 of FIG. 4 and the communication interface 420 of FIG. 4, respectively.

The first user interface 518 can include a first display interface 530. The first user interface 518 and the first display interface 530 can be similarly described as the user interface 402 of FIG. 4 and the display interface 202 of FIG. 4, respectively.

The location unit 520 can include a location interface 532. The location unit 520 and the location interface 532 can be similarly described as the location unit 406 of FIG. 4 and the location interface 416 of FIG. 4, respectively.

The performance, architectures, and type of technologies can also differ between the first device 102 and the first device 502. For example, the first device 102 can function as a single device embodiment of the present invention and can have a higher performance than the first device 502. The first device 502 can be similarly optimized for a multiple device embodiment of the present invention.

For example, the first device 102 can have a higher performance with increased processing power in the control unit 408 compared to the first control unit 512. The storage unit 404 can provide higher storage capacity and access time compared to the first storage unit 514.

Also for example, the first device 502 can be optimized to provide increased communication performance in the first communication unit 516 compared to the communication unit 410. The first storage unit 514 can be sized smaller compared to the storage unit 404. The first software 526 can be smaller than the software 412 of FIG. 4.

The second device 506 can be optimized for implementing the present invention in a multiple device embodiment with the first device 502. The second device 506 can provide the additional or higher performance processing power compared to the first device 502. The second device 506 can include a second control unit 534, a second communication unit 536, and a second user interface 538.

The second user interface 538 allows a user (not shown) to interface and interact with the second device 506. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 500. The second software 542 can operate in conjunction with the first software 526. The second control unit 534 can provide additional performance compared to the first control unit 512 or the control unit 408.

The second control unit 534 can operate the second user interface 538 to display information. The second control unit 534 can also execute the second software 542 for the other functions of the navigation system 500, including operating the second communication unit 536 to communicate with the first device 502 over the communication path 504.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 506. The second controller interface 544 can also be used for communication that is external to the second device 506.

The second controller interface 544 can receive information from the other functional units or from external sources, or can transmit information to the other functional units or to external destinations. The external sources and the external destinations refer to sources and destinations external to the second device 506.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 500 is shown with the second storage unit 546 as a single hierarchy storage system, although it is understood that the navigation system 500 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the location unit 406 and other functional units in the second device 506. The second storage interface 548 can also be used for communication that is external to the second device 506.

The second storage interface 548 can receive information from the other functional units or from external sources, or can transmit information to the other functional units or to external destinations. The external sources and the external destinations refer to sources and destinations external to the second device 506.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 506. For example, the second communication unit 536 can permit the second device 506 to communicate with the first device 502 over the communication path 504.

The second communication unit 536 can also function as a communication hub allowing the second device 506 to function as part of the communication path 504 and not limited to be an end point or terminal unit to the communication path 504. The second communication unit 536 can include active and passive components, such as microelectronics or an antenna, for interaction with the communication path 504.

The second communication unit 536 can include a second communication interface 550. The second communication interface 550 can be used for communication between the second communication unit 536 and other functional units in the second device 506. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 504 to send information to the second device 506 in the first device transmission 508. The second device 506 can receive information in the second communication unit 536 from the first device transmission 508 of the communication path 504.

The second communication unit 536 can couple with the communication path 504 to send information to the first device 502 in the second device transmission 510. The first device 502 can receive information in the first communication unit 516 from the second device transmission 510 of the communication path 504. The navigation system 500 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 506 can include other functional units not shown in FIG. 5 for clarity.

The functional units in the first device 502 can work individually and independently of the other functional units. The first device 502 can work individually and independently from the second device 506 and the communication path 504.

The functional units in the second device 506 can work individually and independently of the other functional units. The second device 506 can work individually and independently from the first device 502 and the communication path 504.

For illustrative purposes, the navigation system 500 is described by operation of the first device 502 and the second device 506. It is understood that the first device 502 and the second device 506 can operate any of the modules and functions of the navigation system 500. For example, the first device 502 is described to operate the location unit 520, although it is understood that the second device 506 can also operate the location unit 520.

Figure 6:
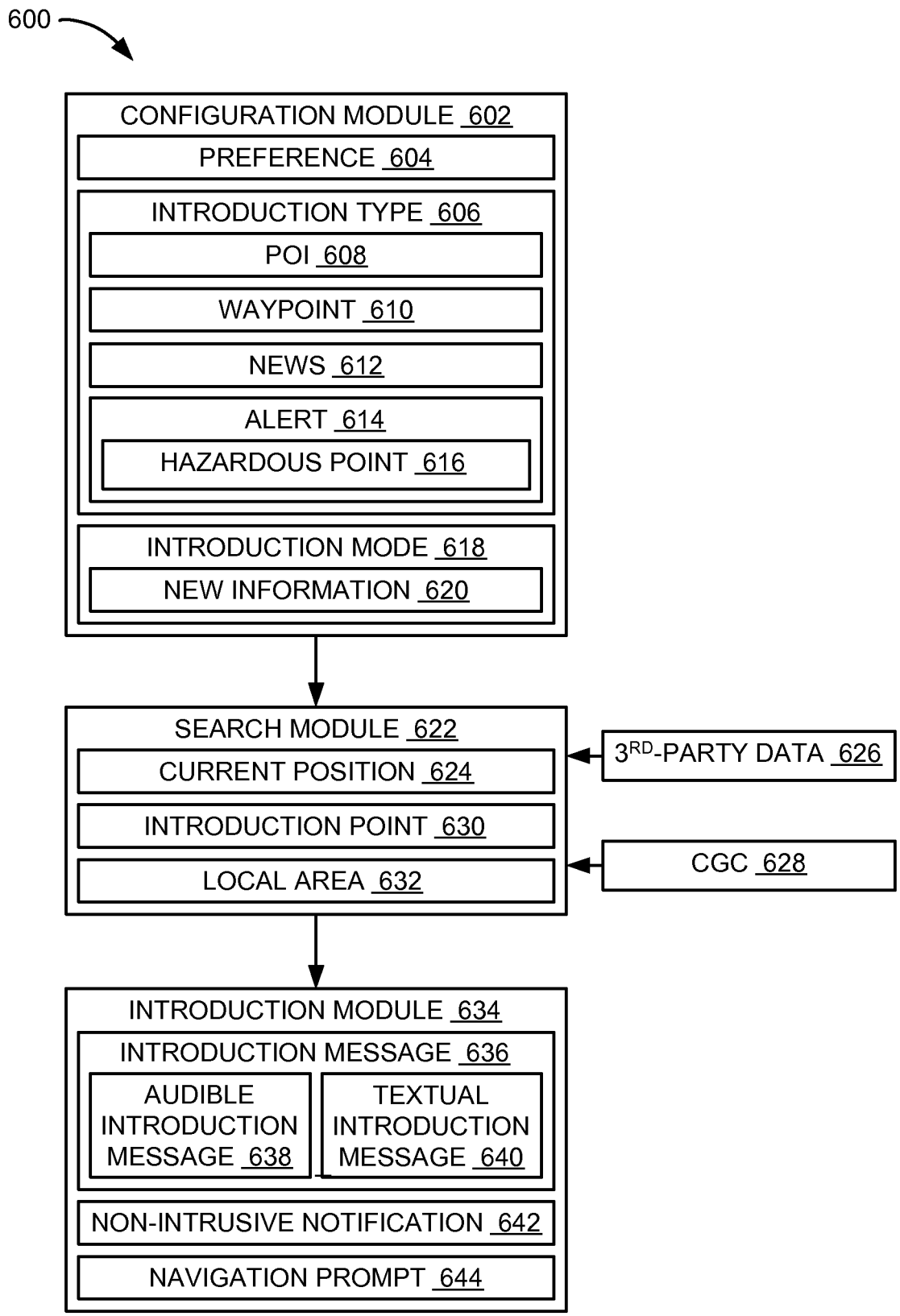
FIG. 6 is a navigation system with audio processing mechanism in a third embodiment of the present invention.

Referring now to FIG. 6, therein is shown a navigation system 600 with audio processing mechanism in a third embodiment of the present invention. The navigation system 600 can include a TeleNav GPS Navigator. In the navigation system 600, as an example, each module is indicated by a number and successively higher module numbers follow one another. Control flow can pass from one module to the next higher numbered module unless explicitly otherwise indicated.

The navigation system 600 can include a configuration module 602, which can provide an ability to configure or select a preference 604 based on a user, an operator, a system, or presets. The preference 604 can be configured, stored, and accessed to select a type of information to be presented for the audible introduction message 204 of FIG. 2 or the audible introduction message 304 of FIG. 3.

For example, the configuration module 602 can be implemented with the first device 102 of FIG. 4. The configuration module 602 can be implemented with the user interface 402 of FIG. 4, the storage unit 404 of FIG. 4, the control unit 408 of FIG. 4, the software 412 of FIG. 4, the storage interface 418 of FIG. 4, or a combination thereof.

Also for example, the configuration module 602 can be implemented with the navigation system 500 of FIG. 5. The configuration module 602 can be implemented with the first control unit 512 of FIG. 5, the first storage unit 514 of FIG. 5, the first user interface 518 of FIG. 5, the first storage interface 524 of FIG. 5, the first software 526 of FIG. 5, or a combination thereof.

The type of information to be presented can include an introduction type 606, such as a point of interest 608, a waypoint 610, news 612, an alert 614, or any combination thereof. The point of interest 608 can include a specific point location that can be interesting or useful. For example, the point of interest 608 can include a scenic site or spot, a park, a beach, a museum, a movie theater, a bank, or a store.

The waypoint 610 can include a specific point location of personal interest. For example, the waypoint 610 can include a location of a home, a camp site, or a relative's house. The news 612 can include information about a specific or timely event.

The news 612 can be selected to include local or regional news from a local radio station, a news channel, a sport channel, an area blog, a financial headline, a weather forecast, or a local company's stock quote or news. The news 612 can be related to a local region that is within a predetermined distance from a current location.

The alert 614 can include a message that serves as a warning of a danger, a hazard, or a caution. The alert 614 can include a warning of approaching or driving to a hazardous point 616, such as a dangerous intersection, a high accident rate area, a high crime rate area, or a combination thereof. The alert 614 can include a warning of approaching a speed trap or an area on a street or at an intersection that has an increased number of traffic citations.

The alert 614 can include critical information. The alert 614 can include an emergency notification of a road closure, a future event related to a road work or a parade, or a road condition, as examples. The alert 614 can include a speed zone reminder based on a speed limit per a correct time or a duration enforced by law. For example, the alert 614 can include the speed zone reminder based on a speed limit at a school zone per a specific duration.

When the emergency notification is presented, the user can take an additional action. For example, when a road block occurs due to a road work or a construction, the user can stop or turn around. Also for example, the navigation system 600 can provide or suggest an alternative route based on a user's navigation preference.

The preference 604 can be configured to include a personal profile. The personal profile can include information about a personal interest or a personal preference. For example, the personal profile can include a movie preference for a new release or a movie genre including action, adventure, comedy, horror, romance, sports, or suspense.

The preference 604 can be configured to include an introduction mode 618. The introduction mode 618 can be configured to specify that only new information 620 can be presented. For example, while approaching or passing a museum, a user can get new exhibit information. Also for example, the user can get the new information 620 about show times of a movie or whether movie tickets are available or sold out.

The user can dynamically get the new information 620 about an event. The new information 620 can be frequently updated or different from a previous delivery of information. Information can be determined as new when the information has not been presented since the previous delivery. The new information 620 can be presented along a static route, which can include a commuter route or a route that is driven everyday. The introduction mode 618 can be configured to specify that all available information based on the introduction type 606 can be presented.

The navigation system 600 can include a search module 622, which can determine a point to be introduced based on the introduction type 606 configured by the user. Determining the point to be introduced can be performed based on a current position 624, which can include a current location of the user or a vehicle. The current position 624 can be calculated based on a latitude, a longitude, an altitude, or a combination thereof. The search module 622 can be coupled to, connected to, or communicated with the configuration module 602.

For example, the search module 622 can be implemented with the first device 102 of FIG. 4. The search module 622 can be implemented with the storage unit 404 of FIG. 4, the location unit 406 of FIG. 4, the control unit 408 of FIG. 4, the communication unit 410 of FIG. 4, the software 412 of FIG. 4, the storage interface 418 of FIG. 4, or a combination thereof.

Also for example, the search module 622 can be implemented with the navigation system 500 of FIG. 5. The search module 622 can be implemented with the first control unit 512 of FIG. 5, the first storage unit 514 of FIG. 5, the first communication unit 516 of FIG. 5, the location unit 520 of FIG. 5, the first storage interface 524 of FIG. 5, the first software 526 of FIG. 5, the second control unit 534 of FIG. 5, the second communication unit 536 of FIG. 5, the second software 542 of FIG. 5, the second storage unit 546 of FIG. 5, the second storage interface 548 of FIG. 5, or a combination thereof.

The navigation system 600 can include third-party data 626, which can include a database or information about the point to be introduced. The third-party data 626 can be provided or supplied by a vendor or as a product supplied by a manufacturer. The third-party data 626 can be provided in text or different formats to allow GPS devices or systems to exchange information.

The third-party data 626 can provide information for the introduction type 606 selected by the user. For example, the third-party data 626 can provide information for the point of interest 608, the news 612, or the alert 614. The third-party data 626 can be provided or stored in the storage interface 418 of FIG. 4, the first storage interface 524 of FIG. 5, the second storage interface 548 of FIG. 5, or a combination thereof.

The navigation system 600 can include a custom-generated content 628, which can include a database or information about the point to be introduced. The custom-generated content 628 can be provided or supplied by the user. The custom-generated content 628 can include a user-generated content (UGC), consumer-generated media (UGM), or a user-created content (UCC).

The custom-generated content 628 can include various kinds of media content, publicly available information, or information that are produced by end-users. The custom-generated content 628 can be provided in text or different formats to allow GPS devices or systems to exchange information. The custom-generated content 628 can include different sources, such as discussion boards, blogs, Wikis, social networking sites, news sites, trip planners, memories, mobile photos and videos, customer review sites, or any website that offers ability to share knowledge or comments about a product or an experience.

The custom-generated content 628 can provide information for the introduction type 606 selected by the user. For example, the custom-generated content 628 can provide information for the waypoint 610. The custom-generated content 628 can be provided or stored in the storage interface 418 of FIG. 4, the first storage interface 524 of FIG. 5, the second storage interface 548 of FIG. 5, or a combination thereof.

The search module 622 can select or search for an introduction point 630, which can include a location to be presented to the user based on the preference 604 and the current position 624. Searching for the introduction point 630 can be performed by selecting the location of interest or usefulness within a local area 632, which can include a geographic region or a region within a geographic boundary.

For example, the introduction point 630 can be selected within the local area 632 of the current position 624. The introduction point 630 can be searched based on the preference 604 with the third-party data 626, the custom-generated content 628, or a combination thereof. The local area 632 can be determined based on a predetermined distance from the current position 624.

Searching for the introduction point 630 can be based on the preference 604 and the current position 624. For example, searching for the introduction point 630 can include selecting the news 612 or the hazardous point 616 adjacent the current position 624.

The navigation system 600 can include an introduction module 634, which can present a message about the introduction point 630 of interest or usefulness to the user. Presenting the message can be performed audibly, textually, or graphically. The introduction module 634 can be coupled to, connected to, or communicated with the search module 622.

For example, the introduction module 634 can be implemented with the first device 102 of FIG. 4. The introduction module 634 can be implemented with the user interface 402 of FIG. 4, the storage unit 404 of FIG. 4, the control unit 408 of FIG. 4, the software 412 of FIG. 4, the storage interface 418 of FIG. 4, or a combination thereof.

Also for example, the introduction module 634 can be implemented with the navigation system 500 of FIG. 5. The introduction module 634 can be implemented with the first storage unit 514 of FIG. 5, the first communication unit 516 of FIG. 5, the first user interface 518 of FIG. 5, the first control unit 512 of FIG. 5, the first storage interface 524 of FIG. 5, the first software 526 of FIG. 5, the second control unit 534 of FIG. 5, the second communication unit 536 of FIG. 5, the second software 542 of FIG. 5, the second storage unit 546 of FIG. 5, the second storage interface 548 of FIG. 5, or a combination thereof.

The introduction module 634 can generate and present an introduction message 636 to the user. The introduction message 636 can be composed to include information about the introduction point 630 with the data provided by the third-party data 626, the custom-generated content 628, or a combination thereof.

The introduction module 634 can include an audible introduction message 638, a textual introduction message 640, or a combination thereof. The audible introduction message 638 and the textual introduction message 640 can provide audio and text information, respectively. The audible introduction message 638 can include information pronounced with a text-to-speech (TTS) application.

The audible introduction message 638 can include the audible introduction message 204 of FIG. 2 or the audible introduction message 304 of FIG. 3. The textual introduction message 640 can include the textual introduction message 210 of FIG. 2 or the textual introduction message 310 of FIG. 3.

When the first device 102 or the first device 502 of FIG. 5 gets close to the current position 624 or within the local area 632, the introduction module 634 can automatically start to present the introduction message 636.

The introduction module 634 can present, display, or deliver a non-intrusive notification 642 for the introduction message 636 on the first device 102 or the first device 502. In other words, a presentation or a delivery mechanism of the introduction message 636 can be designed or implemented such that a navigation prompt 644 can be displayed or presented with priority over the introduction message 636 or without being interrupted. The navigation prompt 644 can include an instruction presented by the navigation system 600 to guide the user from a starting point to a destination point.

The non-intrusive notification 642 can prevent a discontinuance of a presentation of the navigation prompt 644. Thus, the navigation prompt 644 can be presented based on the current position 624 without being interrupted during a presentation of the introduction message 636 about the introduction point 630.

For example, the presentation of the introduction message 636 can be paused, the navigation prompt 644 can be presented, and the presentation of the introduction message 636 can be resumed. As such, the navigation prompt 644 can be prioritized and completely presented.

Also for example, presenting the navigation prompt 644 without being interrupted can be performed by having the introduction module 634 deciding or determining when to present the introduction message 636. Deciding when to present the introduction message 636 can include calculating how much time is required before presenting the introduction message 636.

The introduction module 634 can be configured to present a long description or a short description of the introduction message 636. The long description or the short description can provide detailed information or brief information, respectively. If there is insufficient time to present the introduction message 636 before the next presentation of the navigation prompt 644, the introduction module 634 can be configured to present the short description.

The introduction module 634 can be configured to consecutively present a number of the introduction message 636. If the user deviates from a planned navigation route, the navigation system 600 can map out a new navigation route and produce a new set of the introduction message 636.

The navigation system 600 can be partitioned between the first device 502 of FIG. 5 and the second device 506 of FIG. 5. For example, the navigation system 600 can be partitioned into the functional units of the first device 502, the second device 506, or a combination thereof. The navigation system 600 can also be implemented as additional functional units in the first device 102 of FIG. 1, the first device 502, the second device 506, or a combination thereof.

It has been discovered that the non-intrusive notification 642 significantly improves safety by preventing the discontinuance of the presentation of the navigation prompt 644. Further, it has been discovered that providing the navigation prompt 644 timely allows a sufficient amount of time for the user to safely follow a navigation instruction.

It has also been discovered that the introduction message 636 greatly enhances the user's experience. The user's experience is more pleasurable and informative.

The physical transformation of data of the preference 604, the third-party data 626, and the custom-generated content 628 to the introduction point 630 and the introduction message 636 results in movement in the physical world, such as people using the first device 102 of FIG. 1, the first device 102 of FIG. 4, the first device 502 of FIG. 5, the navigation system 600, or vehicles, based on the operation of the navigation system 600. As the movement in the physical world occurs, the movement itself creates additional information that is converted back to the data for further processing with the preference 604, the third-party data 626, and the custom-generated content 628 for the continued operation of the navigation system 600 and to continue the movement in the physical world.

Thus, it has been discovered that the navigation system 600 of the present invention furnishes important and heretofore unknown and unavailable solutions, capabilities, and functional aspects for providing a user-friendly experience and increasing safety.

The navigation system 600 describes the module functions or order as an example. The modules can be partitioned differently. For example, the search module 622 and the introduction module 634 can be grouped or implemented in a single module. Each of the modules can operate individually and independently of the other modules.

Figure 7:
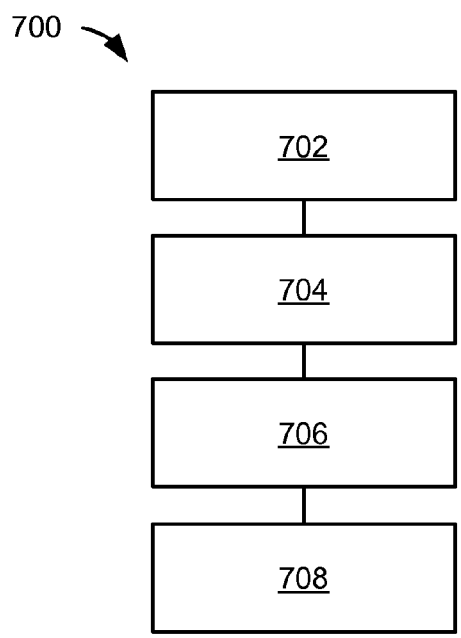
FIG. 7 is a flow chart of a method of operation of a navigation system in a further embodiment of the present invention.

Referring now to FIG. 7, therein is shown a flow chart of a method 700 of operation of a navigation system in a further embodiment of the present invention. The method 700 includes: configuring a preference in a block 702; selecting an introduction point based on the preference in a block 704; composing an introduction message about the introduction point in a block 706; and displaying a non-intrusive notification for the introduction message on a device in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   configuring a preference;
   selecting an introduction point based on the preference;
   composing an introduction message about the introduction point; and
   displaying a non-intrusive notification for a long description or a short description of the introduction message based on a navigation prompt on a device.

2. The method as claimed in claim 1 wherein displaying the non-intrusive notification includes presenting the non-intrusive notification without interrupting a navigation prompt.

3. The method as claimed in claim 1 wherein composing the introduction message includes composing the introduction message with the new information based on the preference.

4. The method as claimed in claim 1 wherein selecting the introduction point includes selecting news based on the preference.

5. The method as claimed in claim 1 wherein selecting the introduction point includes selecting a hazardous point based on the preference.

6. A method of operation of a navigation system comprising:
   configuring a preference;
   selecting an introduction point based on the preference;
   composing an introduction message about the introduction point;
   displaying a non-intrusive notification for a long description or a short description of the introduction message based on a navigation prompt on a device; and
   displaying the navigation prompt on the device without being interrupted by the non-intrusive notification.

7. The method as claimed in claim 6 wherein displaying the navigation prompt includes:
   pausing a presentation of the introduction message about the introduction point;
   presenting the navigation prompt based on a current position; and
   resuming the presentation of the introduction message.

8. The method as claimed in claim 6 further comprising:
   providing third-party data, a custom-generated content, or a combination thereof; and
   wherein:
   composing the introduction message includes composing the introduction message with new information based on the preference, the new information updated by the third-party data, the custom-generated content, or the combination thereof.

9. The method as claimed in claim 6 wherein selecting the introduction point includes selecting news based on the preference, the news within a local area.

10. The method as claimed in claim 6 wherein selecting the introduction point includes selecting a hazardous point based on the preference, the hazardous point including a high crime rate area, a high accident rate area, or a combination thereof.

11. A navigation system comprising
    a configuration module for configuring a preference stored and accessed in a storage unit;

a search module, coupled to the configuration module, for selecting an introduction point based on the preference;

a control unit, coupled to the search module, for composing an introduction message about the introduction point; and an introduction module coupled to the search module, for displaying a non-intrusive notification for a long description or a short description of the introduction message based on a navigation prompt on a device.

12. The system as claimed in claim 11 further comprising a user interface, coupled to the control unit, for presenting the non-intrusive notification without interrupting a navigation prompt.

13. The system as claimed in claim 11 wherein the control unit is for composing the introduction message with the new information based on the preference.

14. The system as claimed in claim 11 wherein the control unit is for selecting news based on the preference.

15. The system as claimed in claim 11 wherein the control unit is for selecting a hazardous point based on the preference.

16. The system as claimed in claim 11 further comprising an user interface, coupled to the control unit, for displaying the navigation prompt on the device without being interrupted by the non-intrusive notification.

17. The system as claimed in claim 16 wherein:
the control unit is for pausing a presentation of the introduction message about the introduction point;
the introduction module is for presenting the navigation prompt based on a current position; and
further comprising:
a user interface, coupled to the control unit, for resuming the presentation of the introduction message.

18. The system as claimed in claim 16 further comprising:
the introduction module is for providing third-party data, a custom-generated content, or a combination thereof; and
the control unit is for composing the introduction message with new information based on the preference, the new information updated by the third-party data, the custom-generated content, or the combination thereof.

19. The system as claimed in claim 16 wherein the control unit is for selecting news based on the preference, the news within a local area.

20. The system as claimed in claim 16 wherein the control unit is for selecting a hazardous point based on the preference, the hazardous point including a high crime rate area, a high accident rate area, or a combination thereof.

* * * * *